United States Patent
Van Deurzen et al.

(10) Patent No.: US 12,549,046 B2
(45) Date of Patent: Feb. 10, 2026

(54) COOLING OF AN ELECTRIC MOTOR

(71) Applicant: Punch Powertrain PSA e-transmissions NV, Sint-Truiden (BE)

(72) Inventors: Antonius Arnoldus Maria Van Deurzen, Boekel (NL); Paul Johannes Mathias Meerts, Zeist (NL)

(73) Assignee: PUNCH POWERTRAIN PSA E-TRANSMISSIONS NV, Sint-Truiden (BE)

( * ) Notice: Subject to any disclaimer, the term of this patent is extended or adjusted under 35 U.S.C. 154(b) by 197 days.

(21) Appl. No.: 18/556,288

(22) PCT Filed: Apr. 22, 2022

(86) PCT No.: PCT/EP2022/060754
§ 371 (c)(1),
(2) Date: Oct. 19, 2023

(87) PCT Pub. No.: WO2022/223810
PCT Pub. Date: Oct. 27, 2022

(65) Prior Publication Data
US 2024/0195249 A1    Jun. 13, 2024

(30) Foreign Application Priority Data
Apr. 23, 2021 (NL) .................................. 2028054

(51) Int. Cl.
*H02K 1/32* (2006.01)
*H02K 9/19* (2006.01)

(52) U.S. Cl.
CPC .................. *H02K 1/32* (2013.01); *H02K 9/19* (2013.01)

(58) Field of Classification Search
CPC .................................. H02K 1/32; H02K 9/19
See application file for complete search history.

(56) References Cited

U.S. PATENT DOCUMENTS

| | | | | |
|---|---|---|---|---|
| 2,724,433 A | * | 11/1955 | Witherell | F23D 11/001 239/351 |
| 10,038,355 B2 | * | 7/2018 | Brauer | H02K 9/19 |

(Continued)

FOREIGN PATENT DOCUMENTS

| | | | | |
|---|---|---|---|---|
| CN | 113875126 A | * | 12/2021 | ............... H02K 9/19 |
| CN | 115133715 A | * | 9/2022 | ............. H02K 5/161 |

(Continued)

OTHER PUBLICATIONS

International Search Report dated Aug. 2, 2023, issued in corresponding International Application No. PCT/EP2022/060754 (3 pgs.).

(Continued)

*Primary Examiner* — Pedro J Cuevas
(74) *Attorney, Agent, or Firm* — Pillsbury Winthrop Shawm Pittman, LLP

(57) ABSTRACT

A spray disc is provided for a rotor assembly for an electric motor, comprising a spray disc body with an inner radius and an outer radius. The spray disc body comprises a first spray outlet and a second spray outlet, provided at or near the outer radius of the spray disc body and a spray disc conduit network, providing a fluid flow path between the inner radius of the spray disc body and the first and second spray outlets through the spray disc body, wherein the first spray outlet is axially offset from the second spray outlet. As such, a larger surface area of stator windings may be sprayed.

10 Claims, 2 Drawing Sheets

(56) References Cited

U.S. PATENT DOCUMENTS

| | | | | |
|---|---|---|---|---|
| 10,224,786 | B2* | 3/2019 | Woolmer | H02K 1/32 |
| 11,251,682 | B2* | 2/2022 | Lee | H02K 1/145 |
| 12,009,703 | B2* | 6/2024 | Yang | H02K 5/203 |
| 2013/0038151 | A1* | 2/2013 | Ohashi | H02K 7/086 |
| | | | | 310/59 |
| 2016/0204678 | A1* | 7/2016 | Woolmer | H02K 9/19 |
| | | | | 310/54 |
| 2017/0012500 | A1* | 1/2017 | Brauer | H02K 1/32 |
| 2020/0204044 | A1* | 6/2020 | Lee | H02K 1/20 |
| 2022/0294295 | A1* | 9/2022 | Yang | H02K 1/32 |
| 2024/0322624 | A1* | 9/2024 | Takahata | H02K 9/19 |
| 2024/0421655 | A1* | 12/2024 | Bahena | H02K 9/06 |
| 2025/0015657 | A1* | 1/2025 | Kummer | H02K 1/32 |

FOREIGN PATENT DOCUMENTS

| | | | | |
|---|---|---|---|---|
| EP | 4311083 A1 * | 1/2024 | | B64D 27/33 |
| JP | 2014-230388 A | 12/2014 | | |
| JP | 6221947 B2 | 11/2017 | | |

OTHER PUBLICATIONS

Written Opinion of the International Searching Authority dated Aug. 2, 2023, issued in corresponding International Application No. PCT/EP2022/060754 (8 pgs.).

* cited by examiner

COOLING OF AN ELECTRIC MOTOR

CROSS-REFERENCE TO RELATED APPLICATIONS

This application is the U.S. National Stage of PCT/EP2022/060754, filed Apr. 22, 2022, which claims priority to Netherlands Patent Application No. 2028054, filed Apr. 23, 2021, the contents of each of which are incorporated herein by reference in their entireties.

TECHNICAL FIELD

The aspects and embodiments thereof relate to cooling of an electric motor.

BACKGROUND

Electric motors usually comprise a stator and a rotor, which rotor is provided inside the stator around a shaft. The stator comprises windings, which windings warm up when a current flows through them. To cool the windings, a fluid such as oil may be used.

Electric machines, such as an electric motor, generate heat when in use. Electric generators and electric motors in particular generate a certain amount of heat which may determine the power an electric generator or an electric motor can supply. Optimizing heat dissipation is therefore important in many aspects, and has particularly grown in interest with the introduction of electric motors in electric or hybrid vehicles. Use of an electric motor in an electric or hybrid vehicle is subject to increasing requirements on torque and/or power generation. To meet these increasing requirements, effective cooling of the electric motor is needed. An electric motor can for example be a switch reluctance motor, an induction motor, a permanent magnet synchronous motor or any other type of electric motor having a rotor and a stator.

The use of fluid for fluid cooling of an electric machine can be possible. Cooling channels may then be provided in parts of the electric machine. Fluid cooling can be combined with air cooling and/or conductive cooling to achieve optimized cooling while keeping energy costs to a minimum.

It is known to provide cooling channels in the rotor, and providing openings in the channel to allow the cooling fluid to leave the cooling channel towards the exterior of the rotor. Cooling of the stator coils may thus be envisaged in addition to cooling of the rotor by the liquid in the channel. However, it has been observed that in view of the increasing demands to an electric motor, cooling of motor is often not sufficiently efficient and the motor becomes too warm. In particular, the windings of the stator appear to be not sufficiently cooled. The inefficient division of cooling fluid over stator windings impairs the performance of the electric motor.

Therefor, there is a need of a more efficient cooling of the electric machine. In particular, there is a need for a more efficient cooling of the stator windings.

SUMMARY

It is preferred to provide for improved cooling of the stator of an electric motor using oil cooling.

In a first aspect, a spray disc for a rotor assembly for an electric motor is provided. The spray disc comprises a spray disc body with an inner radius and an outer radius. The spray disc body comprises a first spray outlet and a second spray outlet, provided at or near the outer radius of the spray disc body and a spray disc conduit network. The spray disc conduit network provides a fluid flow path between the inner radius of the spray disc body and the first spray outlet through the spray disc body and between the inner radius of the spray disc body and the second spray outlet through the spray disc body. The first spray outlet is axially offset from the second spray outlet.

In conventional spray discs, which may be embodied also as balance discs, a radial passage is provided with an inlet and an outlet, such that a fluid flow path is provided through the disc. It is found that because a single outlet is provided for the fluid, only a relatively small surface of the stator can be sprayed with oil, resulting in an inefficient cooling of the stator windings.

Now, to improve the cooling of the stator, using the axially offset spray outlets, a larger surface area of the stator can be sprayed with oil which may advantageously increase cooling of the stator.

Advantageously, the spray disc body comprises a first fluid inlet at the inner radius, wherein the first fluid inlet is in fluid connection with at least an associated one of the first spray outlet and of the second spray outlet. Hence, only a single fluid inlet may be required at the inner radius to provide fluid to the two spray outlets. This may allow for an effective and/or compact configuration of the spray disc.

As an option for embodiments of the spray disc, the first fluid inlet may be in fluid connection with the first spray outlet and with the second spray outlet. Here, in fluid connection may imply that the spray disc conduit network provides a first fluid flow path between the first fluid inlet and the first spray outlet and a second fluid flow path between the first fluid inlet and the second spray outlet.

For example, a radial passage may extend between the first fluid inlet and the first spray outlet, and a bifurcated passage may protrude from the radial passage and may extend between the radial passage and the second spray outlet, wherein the first fluid path may be provided through the radial passage and the second fluid path may be provided through a part of the radial passage and the bifurcated passage.

In further examples, as an option, more than one bifurcated passage may protrude from the radial passage and more than two spray outlets may be provided. For example, embodiments are envisioned with two or more bifurcated passages and a three or more axially offset spray outlets.

Alternatively and/or additionally, the spray disc body comprises a first fluid inlet and a second fluid inlet at the inner radius, wherein the first fluid inlet is in fluid connection with at least an associated one of the first spray outlet and of the second spray outlet.

For example, two radial passages may be provided through the spay disc body as a part of the spray disc conduit network. A first of the radial passages may extend between the first fluid inlet and the first spray outlet, and a second of the radial passages may extend between the second fluid inlet and the second spray outlet. As an option, radial passages may be axially offset.

A radial passage may be defined as a fluid conduit which is at least partially oriented in a radial direction. The radial direction may be a purely radial direction perpendicular to the axial direction, or may be at a particular angle relative to the axial direction other than 90 degrees. Different sections of a radial passage may be oriented differently.

As an option, the first fluid inlet may be axially offset from the second fluid inlet. As a further option, the first fluid inlet may be circumferentially offset from the second fluid inlet.

As an even further option, the first spray outlet may be circumferentially offset from the second spray outlet.

The person skilled in the art will appreciate that embodiments of spray discs are envisioned comprising a plurality of sets of fluid inlets and spray outlets as described above. These sets may be offset at an angle relative to each other. For example, two sets may be 180 degrees offset, 3 sets may 120 degrees offset, and four sets may be 90 degrees offset relative to each other.

A spray outlet may be provided with a spray nozzle arranged to distribute the fluid flow and/or further guide the fluid flow and/or to change the shape of the fluid flow. For example, spray nozzles may be used to disperse the fluid flow into droplets, for example to be able to spray an even larger surface area of the stator windings.

As an option, the spray disc conduit network may comprise a second bifurcated passage protruding from the radial passage and extending between the radial passage and a third spray outlet comprised by the spray disc body, which third spray outlet is axially offset from the first spray outlet and the second spray outlet. As such, a third fluid flow path may be provided through a part of the radial passage, via the second bifurcated passage to the third spray outlet.

As a further option, the spray disc conduit network may comprise a second bifurcated passage protruding from the first bifurcated passage and extending between the first bifurcated passage and a third spray outlet comprised by the spray disc body, which third spray outlet is axially offset from the first spray outlet and the second spray outlet. As such, a third fluid flow path may be provided through a part of the radial passage, via a part of the first bifurcated passage and the second bifurcated passage to the third spray outlet.

In general, a flow-through area of a passage may be substantially circular, such that the passage may for example be drilled or casted. Flow-through areas may also be shaped otherwise, for example as an ellipse, oblong, or any other shape. Furthermore, the actual flow-through area, which may be expressed for example in $mm^2$, may be different for different passages or different parts of the same passage. A person skilled in the art will appreciate that the passages may be designed to allow for a desired flow rate through the passages, taking into account the manufacturability of said passages.

A second aspect provides a rotor assembly, comprising a shaft with an outer circumference a rotor body mounted around the shaft, and a spray disc according to the first aspect, mounted around the shaft adjacent to a first side of the rotor body.

The shaft may comprise a fluid flow channel having a shaft inlet at a one end of the shaft, and at least one shaft outlet, wherein the at least one shaft outlet may be positioned at a first side of the shaft corresponding to the first side of the rotor body. The spray disc may be positioned relative to the shaft such that the spray disc conduit network is in fluid connection with the at least one shaft outlet of the shaft fluid channel. As such, easy assembly of the spray disc to the shaft and/or to the electric motor is possible. Advantageously, the spray disc may be provided with positioning elements to facilitate positioning of the spray disc with respect to the rotor shaft and/or to the electric motor such that the spray disc conduit network is in fluid connection with the at least one shaft outlet of the shaft fluid channel.

The rotor assembly according to the second aspect may hence be used to operate together with a stator, and to cool this stator, in particular the windings of the stator external to the stator, using oil spray from the multiple spray outlets. By providing multiple spray outlets axially offset from each other, a larger area can be covered by the sprayed cooling fluid, resulting in a more efficient cooling of the stator windings, allowing an improved performance of the electric motor.

The rotor assembly may further comprise a further spray disc according to the first aspect, mounted around the shaft adjacent to a second side of the rotor body. The fluid flow channel of the shaft may further comprise a second shaft outlet, and the further spray disc may be positioned relative to the shaft such that the spray disc conduit network may be in fluid connection with second shaft outlet of the shaft fluid channel. Many variants are possible of configurations of conduits in the spray disc between at least one inlet and at least two axially offset outlets. Multiple inlets may be provided that can be circumferentially distributed over the spray disc, but multiple inlets may be axially offset as well. At least two outlets may be provided associated with one inlet and/or with associated with at least two inlets.

The first shaft outlet and the second shaft outlet may be axially offset. As a further option, the first shaft outlet and the second shaft outlet are provided at the same side of the rotor body. As an even further option, the first shaft outlet and the second shaft outlet may be circumferentially offset.

Hence, a rotor assembly is envisioned which can provide oil cooling to the stator from both sides of the rotor assembly. The embodiment of the spray disc provided at the first side of the rotor may be the same as the embodiment of the spray disc provided at the second side of the rotor. Alternatively, the embodiment of the spray disc provided at the first side of the rotor may be a different embodiment as the spray disc provided at the second side of the rotor.

A third aspect provides an electric motor, comprising a stator unit comprising a plurality of windings, a rotor assembly according to the second aspect, wherein the rotor assembly is axially aligned with the stator unit such that the first spray outlet and the second spray outlet face towards the windings of the stator unit.

BRIEF DESCRIPTION OF THE FIGURES

In the figures.

DETAILED DESCRIPTION OF THE FIGURES

It is noted that the figures are schematic representations of embodiments of the disclosure and are not to scale. In the figures, the same or similar elements are denoted with the same or similar reference numbers.

Figure 1A:
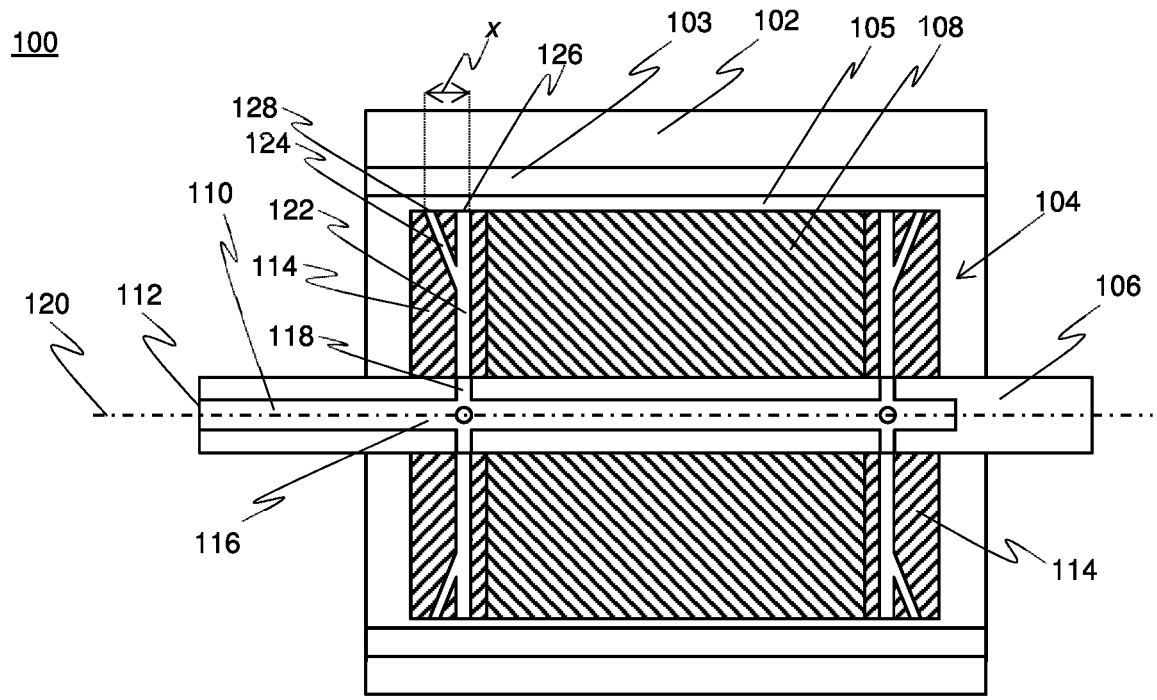
FIG. 1A schematically shows a cross-section of an electric motor.

FIG. 1A schematically shows a cross-section of an electric motor 100, comprising a stator 102 and a rotor assembly 104. The rotor assembly 104 is arranged to rotate relative to the stator 102. The stator 102 comprises a layer of windings 103, which face the rotor assembly 104.

The rotor assembly 104 comprises a shaft body 106 and a magnetic core 108 arranged around the shaft body 106. An air gap 105 is present between the magnetic core 108 and the layer of windings 103.

A supply conduit 110 protrudes into the shaft body 106 and provides a fluid inlet 112 into the shaft body 106. The supply conduit 110 comprises an axial segment 116 which is oriented substantially parallel to a rotation axis 120 of the shaft body 106. The supply conduit 110 further comprises a first radial segment 118, which extends substantially radially relative to the axial segment 116. The axial segment 116 and the first radial segment 118 are formed by a fluid flow channel providing a fluid flow path between the fluid inlet 112 and a first shaft outlet at a downstream end of the first radial segment 118.

The rotor assembly 104 further comprises a first spray disc 114, shown to the left of the magnetic core 108 in FIG. 1A. The spray disc 114 comprises a radial passage 122, of which an inlet is aligned with the first radial segment 118 of the supply conduit 110. A first fluid flow path is provided through the radial passage 122 to a first spray outlet 126.

In the embodiment of FIG. 1, the spray disc 114 further comprises a bifurcated passage 124 which ends in a first spray outlet 128. Hence, a second fluid flow path is provided through a part of the radial passage 122, via the bifurcated passage 124 to the first spray outlet 128.

The first spray outlet 126 is axially offset from the first spray outlet 128 by an axial offset indicated with reference sign x. Preferably, the spray outlets are positioned such that substantially no oil is sprayed into the air gap 105 between the magnetic core 108 and the stator windings 103.

The rotor assembly 104 as shown in FIG. 1A comprises an as option a second spray disc 114 provided on the opposite side of the magnetic core 108 as the first spray disc 114. In this embodiment, the second spray disc 114 is substantially similarly shaped as the first spray disc 114. When substantially similarly shaped spray discs are used, for example only one manufacturing process is required to manufacture the spray discs for a rotor assembly. In other embodiments, different spray discs may be used in a single rotor assembly.

Figure 1B:
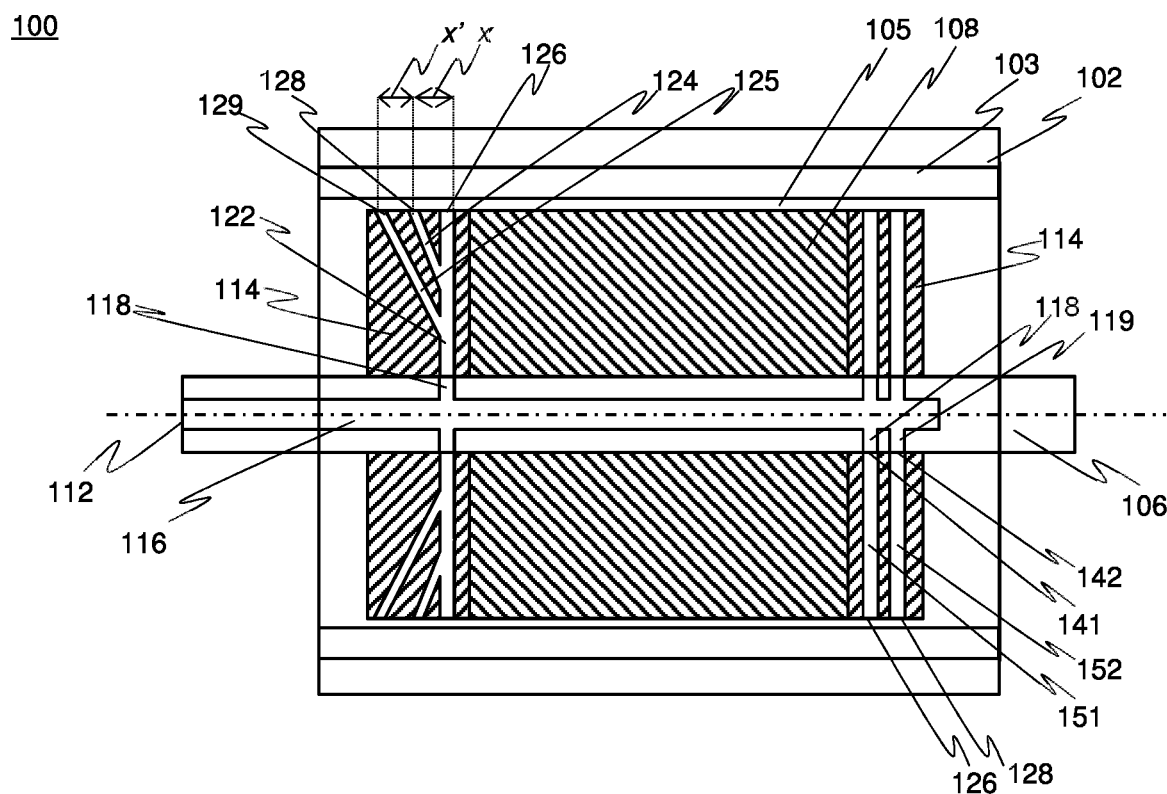
FIG. 1B schematically shows a cross-section of another embodiment of an electric motor.

FIG. 1B schematically shows another embodiment of a rotor assembly 100, which comprises two different embodiments of a spray disc 114 provided at each side of the magnetic core 108.

A first embodiment of the spray disc 114 comprises a radial passage 122, a first bifurcated passage 124 and a second bifurcated passage 125. The spray disc 114 further comprises a first spray outlet 126, second spray outlet 128, and a third spray outlet 129. The first spray outlet 126 and the second spray outlet 128 are axially offset by axial distance x, and the second spray outlet 128 and the third spray outlet 129 are axially offset by axial distance x'. In embodiments, axial distances x and x' may be substantially the same, or one may be larger than the other.

A first fluid flow path is provided between the fluid inlet 112 and the first spray outlet 126, via the axial segment 116, radial segment 118, and radial passage 122.

A second fluid flow path is provided between the fluid inlet 112 and the second spray outlet 128, via the axial segment 116, radial segment 118, a part of the radial passage 122, and the first bifurcated passage 124.

A third fluid flow path is provided between the fluid inlet 112 and the third spray outlet 129, via the axial segment 116, radial segment 118, a part of the radial passage 122, and the second bifurcated passage 125. Alternatively, the second bifurcated passage 125 may extend from the first bifurcated passage 124.

As an example, the rotor assembly 100 comprises a further embodiment of a spray disc 114 at an opposite side of the magnetic core 108. This particular embodiment of the spray disc 114 comprises a first fluid inlet 141 and a second fluid inlet 142 at the inner radius respectively aligned with a first radial segment 118 and a second radial segment 119 of the shaft body 106. The spray disc 114 further comprises a first radial passage 151 and a second radial passage 152.

For the further spray disc 114, a first fluid flow path is provided between the fluid inlet 112 and the first spray outlet 126 via the axial segment 116 and the first radial passage 151. A second fluid flow path is provided between the fluid inlet 112 and the first spray outlet 126 via the axial segment 116 and the second radial passage 152.

Figure 2:
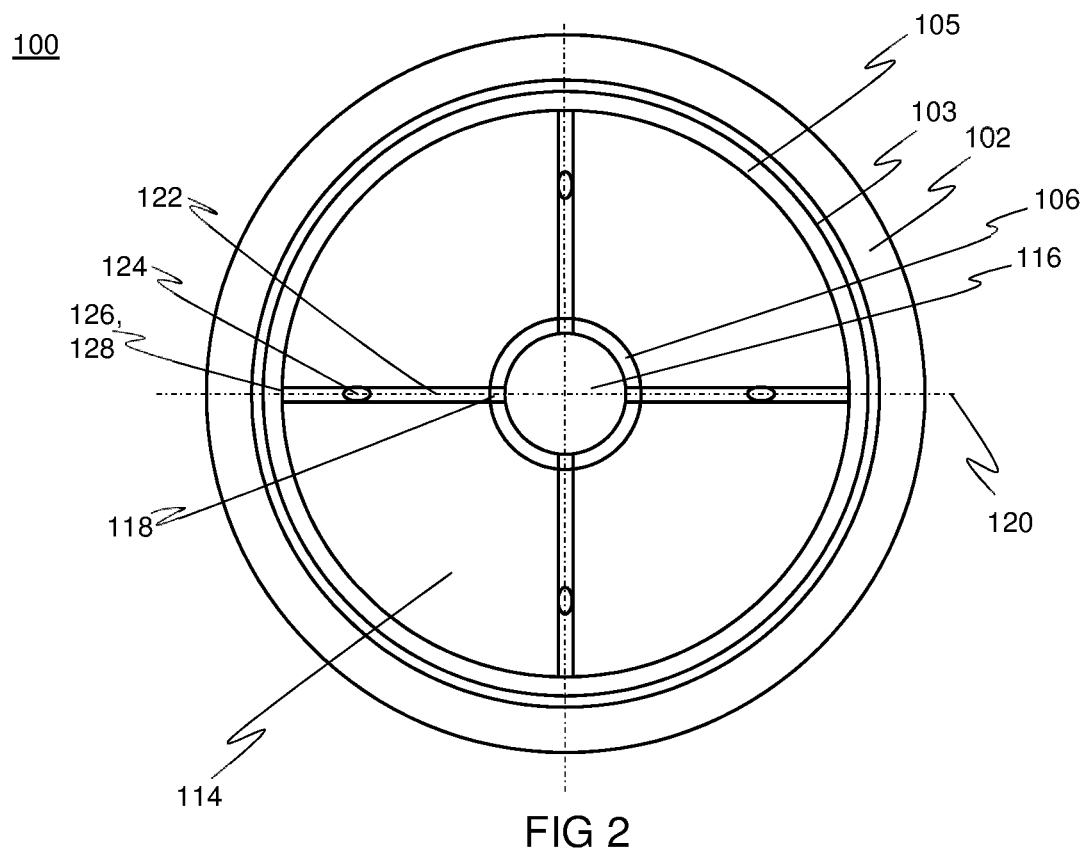
FIG. 2 schematically shows another cross-section of an electric motor.

FIG. 2 schematically shows another cross-section view of a rotor assembly 100, which view is shown in a plane rotated 90 degrees relative to the cross-sectional plane of FIGS. 1A and 1B. In the particular embodiment of FIG. 2, a spray disc 114 is visible, which spray disc 114 comprises four radial passages 122 which are angularly spaced apart 90 degrees relative to each other. Reference signs are only provided for one of the radial passages 122 for clarity of the figure. The person skilled in the art will appreciate that preferably a spray disc is substantially rotationally symmetric to prevent unbalance while the spray disc is rotated around the rotation axis 120.

In the embodiment FIG. 2, the spray disc 114 comprises the radial passage 122 which ends in the first spray outlet 126. The spray disc 114 further comprises the bifurcated passage 124 which ends in the second spray outlet 128, which in the present view is shown behind the first spray outlet 126. In general, the first spray outlet 126 may be axially closer to the magnetic core 108 than the second spray outlet 128 or the first spray outlet 126 may be axially further away from the magnetic core 108 than the second spray outlet 128.

In general, a spray disc may be formed as a substantially solid cylindrical body with the spray disc conduit network extending through this solid cylindrical body. In other embodiments, the spray disc body may be a substantially open body and at least part of the spray disc conduit network be formed as one or more thin-walled tubes. The latter embodiments may result in a lighter spray disc compared to the substantially solid embodiments.

For example, the spray disc body may comprise an inner ring defining an inner radius of the spray disc. The inner ring may be arranged to be mounted to a shaft. The spray disc conduit network may protrude through and from the inner ring. Between different passages comprised by the spray disc conduit network struts, spokes and/or other connecting elements may be provided for shape stability of the spray disc conduit network.

As a further option, the spray disc body may comprises an outer ring defining an outer radius of the spray disc. Some or all of the spray outlets may be provided by the outer ring. One or more spokes and/or other radial support elements may be provided to connect the outer ring to the inner ring. In embodiments, one or more passages or conduits comprised by the spray disc conduit network may provided the connection between the inner ring and the outer ring.

In general, it may be preferred to provide a spray disc with an as low as possible mass and/or an as low as possible moment of inertia.

In embodiments, at least part of the spray disc conduit network may be formed as flexible tubes. A flexible tube may be connected to the spray disc body only at one end, and hence one end of a flexible tube may be a free end. When the spray disc is rotated at a sufficient rotational speed, the flexible tubes may be oriented substantially radially by virtue of a centrifugal force exerted on the flexible tubes.

It will be appreciated that many embodiments of the spray disc conduit network are envisioned, which may comprise any number of fluid inlets and two or more spray outlets.

Any fluid inlet may be in fluid connection with any spray outlet via the spray disc conduit network. Furthermore, a single fluid inlet may be in fluid connection with one, two or more spray outlets. Also, a single spray outlet may be in fluid connection with one, two or more fluid inlets.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. An electric motor, comprising:
a stator unit and a rotor assembly axially aligned with the stator unit, wherein the stator unit comprises a plurality of windings, and wherein the rotor assembly comprises a shaft with an outer circumference; a rotor body mounted around the shaft; and a spray disc mounted around the shaft adjacent to a first side of the rotor body,
wherein the spray disc comprises a spray disc body with an inner radius and an outer radius, which spray disc body comprises:
a first spray outlet and a second spray outlet, provided at or near the outer radius of the spray disc body and wherein the first spray outlet is axially offset from the second spray outlet and wherein the first spray outlet and the second spray outlet face towards the plurality of windings of the stator unit; and
a spray disc conduit network, providing a fluid flow path between the inner radius of the spray disc body and the first spray outlet and the second spray outlet through the spray disc body, wherein the spray disc conduit network comprises a radial passage extending between a first fluid inlet and the first spray outlet, and a bifurcated passage protruding from the radial passage and extending between the radial passage and the second spray outlet, and wherein a first fluid path is provided through the radial passage and a second fluid path is provided through a part of the radial passage and the bifurcated passage;
wherein the shaft of the rotor assembly comprises a fluid flow channel having a shaft inlet at one end of the shaft, and at least one shaft outlet, wherein the at least one shaft outlet is positioned at a first side of the shaft corresponding to the first side of the rotor body, and wherein the spray disc is positioned relative to the shaft such that the spray disc conduit network is in fluid connection with the at least one shaft outlet of the fluid flow channel.

2. The electric motor according to claim 1, wherein the first fluid inlet of the spray disc conduit network is at the inner radius of the spray disc and is in fluid connection with at least an associated one of the first spray outlet and of the second spray outlet.

3. The electric motor according to claim 1, wherein the first fluid inlet of the spray disc is in fluid connection with the first spray outlet and with the second spray outlet.

4. The electric motor according to claim 1, wherein the spray disc conduit network comprises a second fluid inlet at the inner radius of the spray disc, which second fluid inlet is in fluid connection with at least an associated further one of the first spray outlet and of the second spray outlet.

5. The electric motor according to claim 4, wherein the first fluid inlet is axially offset from the second fluid inlet.

6. The electric motor according to claim 1, wherein the spray disc conduit network comprises a second bifurcated passage protruding from the bifurcated passage and extending between the bifurcated passage and a third spray outlet comprised by the spray disc body, which third spray outlet is axially offset from the first spray outlet and the second spray outlet.

7. The electric motor according to claim 1, wherein the first spray outlet is circumferentially offset from the second spray outlet.

8. The electric motor according to claim 1, wherein the rotor assembly further comprises a further spray disc comprising a spray disc body with an inner radius and an outer radius, which spray disc body comprises: a first spray outlet and a second spray outlet, provided at or near the outer radius of the spray disc body; and a spray disc conduit network, providing a fluid flow path between the inner radius of the spray disc body and the first spray outlet and the second spray outlet through the spray disc body; wherein the first spray outlet is axially offset from the second spray outlet, mounted around the shaft adjacent to a second side of the rotor body, wherein the fluid flow channel of the shaft further comprises a second shaft outlet, and wherein the further spray disc is positioned relative to the shaft such that the spray disc conduit network is in fluid connection with the second shaft outlet of the fluid flow channel.

9. The electric motor according to claim 8, wherein an axial distance between the first spray outlet and the rotor body is smaller than an axial distance between the second spray outlet and the rotor body.

10. The electric motor according to claim 8, wherein an axial distance between the first spray outlet and the rotor body is larger than an axial distance between the second spray outlet and the rotor body.

* * * * *